(12) United States Patent
Nguyen et al.

(10) Patent No.: US 7,831,454 B2
(45) Date of Patent: Nov. 9, 2010

(54) SYSTEM AND METHOD FOR SELECTING A BUSINESS LOCATION, WHEREIN THE BUSINESS LOCATION HAS AN ACTIVITY LEVEL INDICATOR

(75) Inventors: Truc Nguyen, San Diego, CA (US); William Su, Corona, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1314 days.

(21) Appl. No.: 11/138,729

(22) Filed: May 26, 2005

(65) Prior Publication Data

US 2006/0271417 A1 Nov. 30, 2006

(51) Int. Cl.
*G06F 9/44* (2006.01)
(52) U.S. Cl. ......................................................... 705/7
(58) Field of Classification Search ...................... 705/7
See application file for complete search history.

(56) References Cited

U.S. PATENT DOCUMENTS

| | | | |
|---|---|---|---|
| 5,515,270 A * | 5/1996 | Weinblatt | 705/14.25 |
| 5,630,068 A * | 5/1997 | Vela et al. | 705/323 |
| 5,638,519 A * | 6/1997 | Haluska | 705/28 |
| 6,298,328 B1 * | 10/2001 | Healy et al. | 705/10 |
| 6,690,777 B2 | 2/2004 | Pecht | |
| 2002/0010608 A1 | 1/2002 | Faber et al. | |
| 2002/0077876 A1 | 6/2002 | O'Meara et al. | |
| 2002/0111172 A1* | 8/2002 | DeWolf et al. | 455/456 |
| 2003/0050075 A1 | 3/2003 | Rangarajan et al. | |
| 2003/0220835 A1 | 11/2003 | Barnes, Jr. | |
| 2004/0203927 A1 | 10/2004 | Kraft | |
| 2004/0243446 A1 | 12/2004 | Wyatt | |
| 2006/0230137 A1* | 10/2006 | Gare et al. | 709/224 |
| 2007/0038516 A1* | 2/2007 | Apple et al. | 705/14 |

* cited by examiner

*Primary Examiner*—Romain Jeanty
(74) *Attorney, Agent, or Firm*—SoCal IP Law Group LLP; Steven C. Sereboff; Jonathan Pearce

(57) ABSTRACT

A method for directing customers to a business establishment. A query is received from an associated user representing a desired purveyor of a selected good or service in a selected geographic area. Data is then secured representing a set of purveyors of the desired goods or services in the selected geographic area. Business activity data is then acquired corresponding to business activities for each of the purveyors in the set. A business activity level signal is then generated to represent the level of business activity for each purveyor in the set. This data is then communicated to the associated user.

25 Claims, 3 Drawing Sheets

SYSTEM AND METHOD FOR SELECTING A BUSINESS LOCATION, WHEREIN THE BUSINESS LOCATION HAS AN ACTIVITY LEVEL INDICATOR

BACKGROUND OF THE INVENTION

This invention is directed to a system and method for selecting a business location, wherein the business location has an activity level indicator. More particularly, this invention is directed to a system and method for directing customers to a selected business location based on the business activity level of the establishment. In particular, a potential customer receives an indication as to the business activity level, such as customers in line, average wait time, and the like, of selected establishments allowing the customer to select the establishment that offers the most efficient service.

Customers often use store or service establishment locators to find the locations of the stores or services in a selected geographic area. Such store or service locator is typically implemented as a web application or web service. A customer is generally able to identify available service locations within the selected geographic area based on criteria specified by the customer. The customer will then select the most convenient location. Additional information about each location may be provided, such as operating hours, types of services available, and directions.

However, current store or service locators do not provide any real-time information which would assist the customer in selecting a particular location. It would be desirable for a customer to have information about the current activity level of each location, such as the number of customers in line, the average wait time, operating hours, and the like. If the customer were to have such information, the customer would be able to select the most accessible location in the selected geographic area with the fewest customers or the shortest waiting time. As current store or service locators do not provide such information, the customer will randomly pick a location based on criteria other than business activity level of the location, such as the services offered or proximity to the customer. The selected location may be very busy and the customer will have a long wait or will decide to go to another location. It would be desirable to have a store or service locator which provides real-time information as to the business activity at each location.

The subject invention overcomes the aforementioned problems and provides a system and method for directing customers to a business location or establishment.

SUMMARY OF THE INVENTION

In accordance with the present invention, there is provided a system and method for selecting a business location, wherein the business location has an activity level indicator.

Further, in accordance with the present invention, there is provided a system and method for directing customers to a selected business location based on the business activity level of each establishment.

Still further, in accordance with the present invention, there is provided a system for selecting a business location, wherein the business location has an activity level indicator. The system includes means adapted for receiving a query from an associated user. The query represents a desired purveyor, or service center of selected goods and/or services in a selected geographic area. The system further includes means adapted for securing data representing a set of purveyors of the selected goods and services in the selected geographic area. The system also comprises means adapted for acquiring business activity data for each purveyor of goods or services in the set. The system further comprises means adapted for generating a business activity level signal. The signal represents the level of business activity for each purveyor in the set. In addition, the system includes means adapted for communicating the set of purveyors data and each corresponding business activity signal to the associated user.

In a preferred embodiment, the system also includes means adapted for generating a color signal representing the business activity level signal, and means adapted for generating ranking information corresponding to the business activity level for each purveyor. In one embodiment, the system further comprises means adapted for communicating the data via at least one of a wireless network data connection and a wired network data connection.

Yet further, in accordance with the present invention, there is provided a method for selecting a business location, wherein the business location has an activity level indicator. A query is received from an associated user representing a desired purveyor of a selected good or service in a selected geographic area. Data is then secured representing a set of purveyors of the desired goods or services in the selected geographic area. Business activity data is then acquired corresponding to business activities for each of the purveyors in the set. A business activity level signal is then generated to represent the level of business activity for each purveyor in the set. This data is then communicated to the associated user.

In a preferred embodiment, a color signal representing the business activity level signal is generated and ranking information corresponding to the business activity level of each purveyor is ascertained. In one embodiment, the query for a purveyor is transmitted over a wireless data communications channel.

Still other aspects of the present invention will become readily apparent to those skilled in the art from the following description wherein there is shown and described a preferred embodiment of this invention, simply by way of illustration of one of the best modes best suited for to carry out the invention. As it will be realized, the present invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE FIGURES

The accompanying drawings incorporated in and forming a part of the specification, illustrate several aspects of the present invention, and together with the description server to explain the principals of the invention. In the drawings.

These and additional embodiments of the invention may now be better understood by turning to the following detailed description wherein an illustrated embodiment is described.

DETAILED DESCRIPTION OF THE PREFERRED EMBODIMENT

Figure 1:
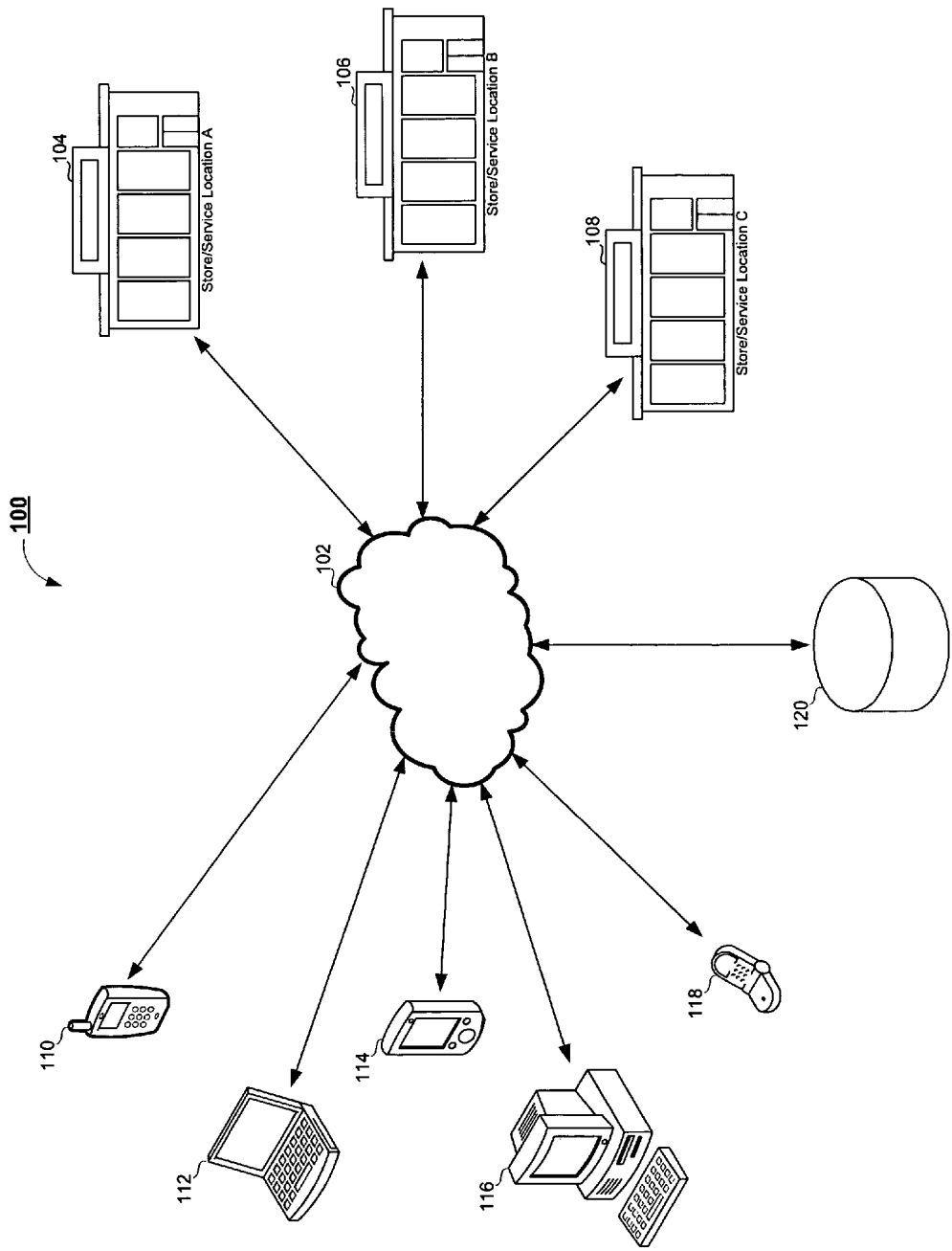
FIG. 1 is a block diagram illustrative of a system in accordance with the present invention.

The present invention is directed to a system and method for selecting a business location, wherein the business location has an activity level indicator. More particularly, the present invention is directed to a system and method for directing customers to a selected business location based on the current business activity level of the establishment. FIG. 1 is a system diagram illustrating a system 100 in accordance with the present invention. The system 100 comprises a computer network, illustrated in FIG. 1 as the Internet 102. Those skilled in the art will appreciate that other computer networks, including, without limitation, Wide Area Networks, Local Area Networks and the like, are equally capable of embodying the subject invention. The system 100 also includes one or more purveyor, or service, locations, illustrated in FIG. 1 as service center (A) 104, service center (B) 106 and service center (C) 108.

In the preferred embodiment, service centers 104-108 of the present invention suitably comprise one or more image generating devices (not shown). However, it is to be appreciated that the subject teachings are suitably used in connection with any service provider, distributor or retailer for which accurate information as to ongoing business activity is advantageously provided to an actual or potential consumer. It is to be appreciated that "service center," as used herein is equally applicable to all such establishments. The one or more image generating devices are any suitable devices known in the art that are capable of generating image outputs in a tangible medium, such as a printer, facsimile machine, scanning device, copier, multifunctional peripheral device, or other like peripheral devices. The image generating devices are any suitable networked image generating devices as will be appreciated to one of ordinary skill in the art. The image generating devices preferably have an internal device controller suitably acting as a fully functional server with the necessary hardware and software that ensure proper operation of the image generating device as will be appreciated by those skilled in the art. In addition, the image generating devices preferably comprise accessible storage mediums, which are suitably a hard disk and random access memory as will be appreciated by those skilled in the art. Such storage medium is suitably integrated into the image generating device or disposed in an associated medium associated therewith. Suitable commercially available image generating devices include, but are not limited to, the Toshiba e-Studio Series Controller.

Each center 104-108, and through them, each image generating device, is suitably connected to a data network, which in the preferred embodiment includes the Internet 102 as is known in the art. The system also includes one or more user devices for locating and displaying to a user the location of a center 104-108 in accordance with the present invention. As shown in FIG. 1, user devices include a smart phone 110, a laptop computer 112, a PDA 114, a desktop computer 116 and a web-enabled cellular telephone 118. However, it is to be appreciated that the subject system contemplates and teaches any data device accessible by a user in connection with assessment of real time, or near real time, information relating to site choice for securing product or services. The system is particularly advantageous when used in conjunction with portable data devices, such as those representative devices listed above. While the use of the Internet maintains the current advantage of widespread adoption and connectivity, it is be appreciated that any suitable, commonly accessible network, accommodates the data connectivity reflected herein. The user devices 110-118 suitably comprise components, as known in the art, to enable them to communicate with the Internet 102. Each of the user devices 110-118 suitably include display means adapted to display graphical location content representative of the service centers 104-108 received via the Internet 102. Service center 104-108 locations and maps corresponding thereto are suitably stored in a database 120 in data communication with the user devices 110-118 via the Internet 102.

As will be understood by those skilled in the art, the user devices 110-118 are adapted to communicate with the service centers 104-108 via any wired or wireless data communications channels. In the preferred embodiment, user devices 110-114, and 118 access the Internet 102 via wireless data communications, including without limitation, IEEE 802.11x, WiMax, Bluetooth, cellular, optical, infrared, and the like. Via such communications channels, the user devices 110-114, and 118 effectively communicate with map database 120 and the web-based service locator of the present invention. In addition, the aforementioned wireless communications channels are capable of being implemented via the desktop 116 having a suitable wireless interface adapter. Alternatively, all user devices 110-118 are capable of accessing the Internet using Ethernet, Token Ring, or other local- or wide-area type networks, without departing from the spirit and scope of the present invention.

Figure 2:
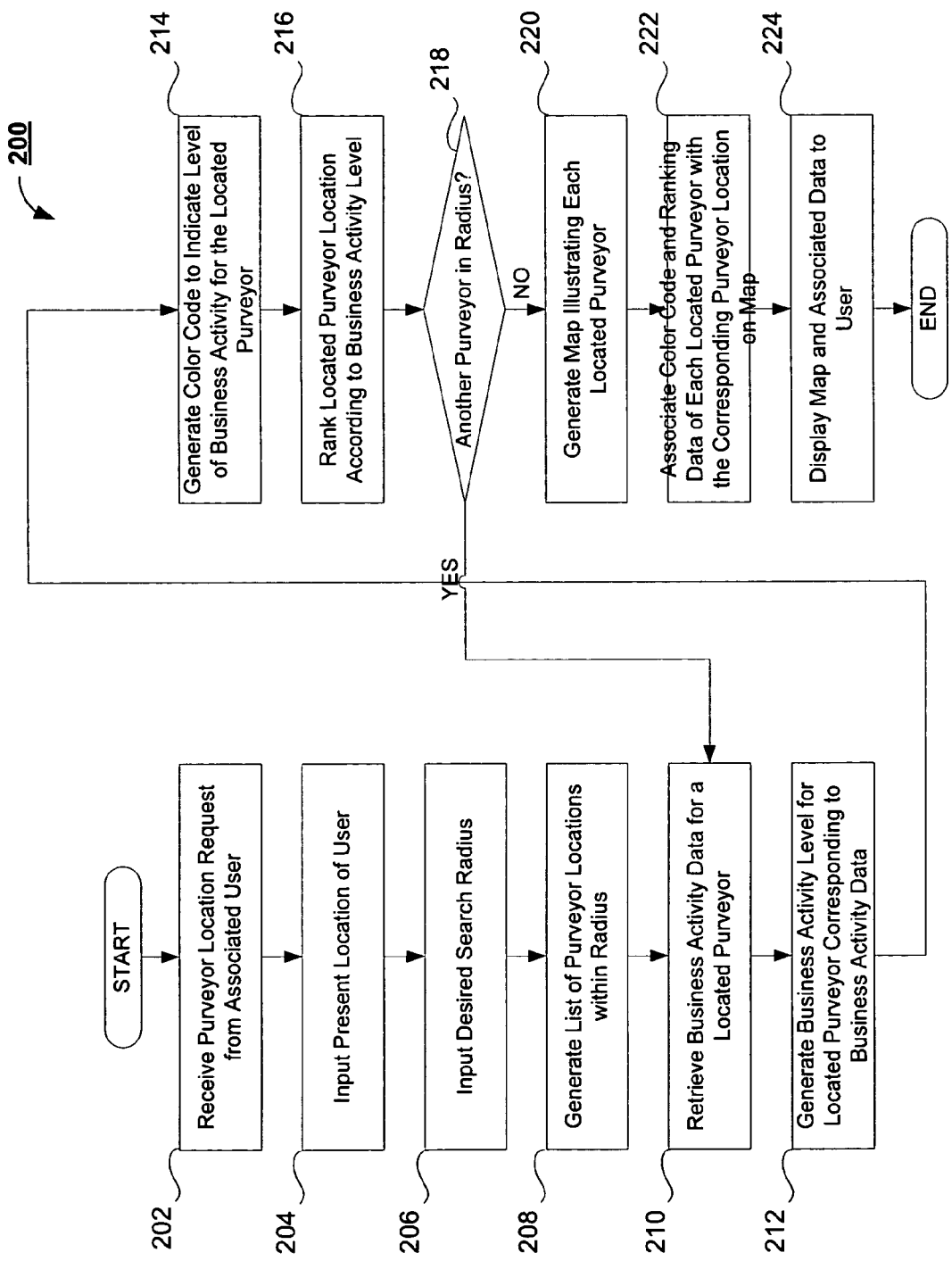
FIG. 2 is a flowchart illustrative of a method in accordance with the present invention.

The system described above will best be understood in combination with the flowchart 200 of FIG. 2, which illustrates a method in accordance with the present invention. Turning now to FIG. 2, the method of the present invention illustrated in flowchart 200 begins at step 202 when a service center locator request is received from an associated user via one of the user devices 110-118 running a service locator application. The skilled artisan will appreciate that the present invention is described in reference to a web-based service locator application, however other means of providing the services described herein are equally capable of being implemented without departing from the scope of the present invention. In the preferred embodiment, the service center locator is a web-based application, or service, suitably adapted to provide to the associated user real-time data representing the business activities, locations, driving directions and the like, corresponding to service center 104-108 locations.

Once the location request has been submitted, the method proceeds to step 204, wherein the associated user inputs his present location using any means known in the art. For example, the associated user enters a GPS signal received by the smart phone 110, the PDA 112, the laptop 114 or the cellular telephone 118 through the integrated input device associated with each respective user device. Alternatively, the associated user, at the desktop computer 116, suitably enters his address and zip code via any means known in the art. The associated user is then prompted, at step 206, to input a desired search radius. The search radius refers to a distance from the user's present location to a service center 104-108. For example, service center (A) 104, service center (B) 106, and service center (C) 108, are each located within the specified search radius. The service locator application then queries the map database 120 and generates a listing of service centers 104-108 located within the designated search radius, including the exemplary service centers (A-C) 104-108.

The service locator application then retrieves, at step 210, business activity data for the first service center, or purveyor, location in the list. The business activity data suitably includes information corresponding to the number of customers in the store, the traffic on the route to the store, the estimated waiting time for access to the one or more image generating devices, and other indicia of business activities taking place at the service center location. The business activity data suitably also includes information relating to whether the service center is currently open or if the service center is located at a distance such that travel time required to reach the service center would result in the service center being closed when the user arrived at the service center. The skilled artisan will appreciate that the data is suitably gathered at the service center location using any means known in the art and suitably retrieved via the Internet 102 from the service centers 104-108. Using FIG. 1 as an example, the service locator application retrieves real-time business data from service center (A) 104. This data is then used to generate a business activity level at step 212 corresponding to the level of activity taking place, in real-time, at service center (A) 104.

The service locator application then generates a suitable indicia, such as a color code, numeric value, graphical indicator or brightness level to represent the level of business activity at service center (A) at step 214. As will be appreciated by those skilled in the art, use of indicia such as the color code provides a visual representation to the user of the level of activity more readily than pure textual information. The service locator application then ranks, at step 216, service center (A) 104 according to the business activity level determined at step 212. A determination is then made at step 218 whether any additional service centers 104-108 are located within the specified search radius. Such radius is suitably specified by a user, or alternatively set to a default value. It is to be appreciated that the subject system includes a combined radius wherein a default is preset, and is selectively overridden by user input relating to a particular user's situation. When an additional service center, service center (B) 106, is located within the specified search radius, the method returns to step 210, wherein business activity data is retrieved from service center B 106. The retrieved data from service center (B) 106 is then used to determine corresponding indicia, such as the color code and rank of the preferred embodiment. This process is repeated for all service centers 104-108 located within the specified search radius, e.g., service center (C) 108. As discussed above, business data associated with service centers which are closed or will be closed when the user is due to arrive at a service center will be retrieved and a suitable indicia for services centers will be generated.

When it is determined at step 218 that no additional service centers 104-108 are located within the specified search radius, the method proceeds to step 220, wherein a map is generated illustrating the location of each located service center 104-108. The skilled artisan will appreciate that the map is suitably generated using map or other geographic data contained in the map database 120 via any means known in the art, which map data is suitably retrieved from an associated user device, or from a remote location via communication from the network, such as the Internet 102 (FIG. 1). Each service center 104-108 location is suitably displayed on the map and associated with the color code and ranking data at step 222. The generated map with associated color and ranking data is then transmitted via the Internet 102 and displayed on the user devices 110-118 at step 224. In one embodiment of the present invention, the user devices 110-118 receive a color coded listing containing the associated color and ranking data of the service center locations 104-108. The color coded list is suitably capable of being displayed at step 224 on the map screen, or on a separate screen on the user devices 110-118. In either display, the list contains service center location 104-108 ranking data and is color coded as set forth above.

Figure 3:
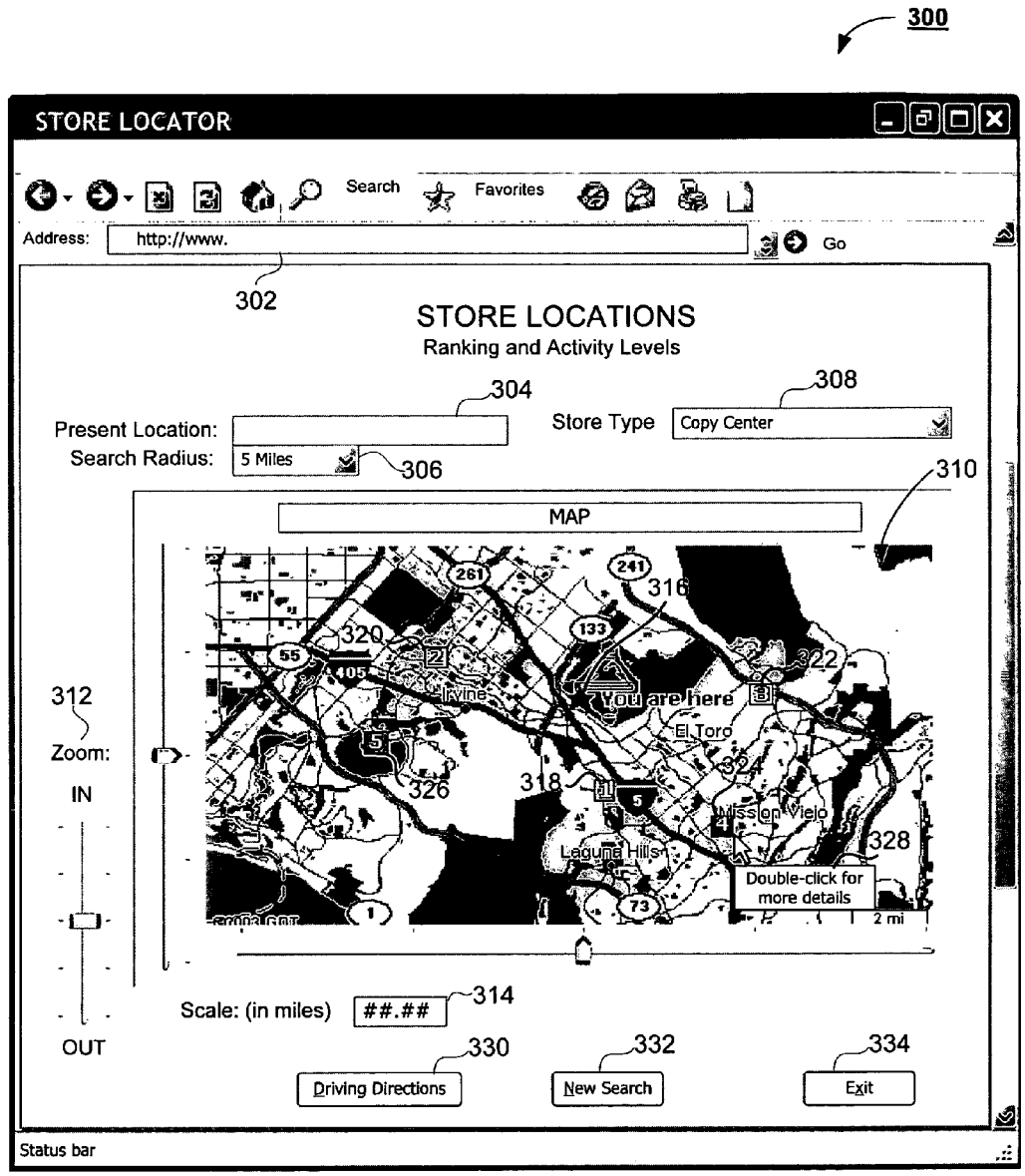
FIG. 3 is a template screen shot illustrative of one embodiment of the present invention.

FIG. 3 illustrates a representative template screen 300, suitably displayed to the associated user on a user device 110-118. As set forth above, in one embodiment, the present invention is implemented as a graphical user interface, which graphical user interface is a web-based application in the preferred embodiment. Screen 300 suitably depicts a web browser, viewable on the user devices 110-118 (FIG. 1). The web browser is any browser known in the art including, without limitation, Internet Explorer, Netscape Navigator, Mozilla, FireFox, Opera and the like. As illustrated in FIG. 3, the address of a web site corresponding to one implementation of the present method is shown in the address bar 302. Once the service locator screen 300 has been displayed, the associated user enters his present address in the present address field 304. The associated user then selects, from the search radius pull-down menu 306, the maximum distance from the present location the user is willing to travel to a service center. The user is also prompted to select, from the store type pull-down menu 308, the type of service center desired, e.g., copy center, email center, and the like. Once this information has been entered, the service locator retrieves service center information in accordance with the method described above, and displays the map 310 on the screen 300.

The associated user is able to zoom in and out of the displayed map 310 using the zoom slide 312 located on the screen 300. The scale of the map 314 is also displayed and editable by the user to adjust the scale of the map without using the zoom slide 312. As explained above, the map 310 suitably displays color coded and ranked service center 104-108 location information. Referring to the map 310 of service centers 104-108 within the search radius 306, an indicator icon 316 is illustrated depicting the present location of the user. Also shown on the map 310 are numeric icons 320-326 illustrating the location of the service centers found within the input search radius. Each numeric icon 320-326 corresponds to the rank of the center versus the other centers found. Alternatively, the rank corresponds to a predetermined ranking structure, based upon one or more preselected factors, such as distance, traffic, travel time, type of work, pending jobs, relative costs and the like. Continuing with the example of FIG. 1, the map 310 displays five service centers located within the search radius, service centers (1-5) 318-326, respectively. For purposes of explanation, service center (1) 318 corresponds to service center (A) 104, service center (2) 320 corresponds to service center (B) 106, and service center (3) 322 corresponds to service center (C) 108. Service centers (4) and (5) 324 and 326, respectively, represent other service centers found within the search radius.

Each numeric icon 318-326 is color coded to illustrate an initial description of the current level of business activity at the corresponding service center. The present invention enables the user to highlight an icon and, by double-clicking the numeric icon, view additional details about the corresponding service center. As shown in FIG. 3, the pointer is on service center (4) 324. While on center (4) 324, a text window 328 is displayed prompting the user to double-click for additional information. In an alternate embodiment, the text box 328 contains additional information, such as wait time per machine, number of imaging jobs pending, number of customers on the premises, and the like. The user is then able to view such information for each service center, if desired, and intelligently select the service center meeting his specific constraints.

Once the user has selected the desired center, he is able to retrieve, from the map database, readable driving directions by selecting the driving directions button 330. Should the user desire a different search, he is able to begin a new search via new search button 332, or exit the present search via exit button 334. Thus, when the user determines that service center (B) 106 has the fewest pending jobs and least number of customers, ranked number (2) on the map 310, the user double-clicks the icon 320 representing service center (B) 106 to select the service center for further distinction. Upon selection, the driving directions button 330 advantageously becomes highlighted, as is known in the art, and the user is able to press the directions button 330 and view a screen (not shown) containing detailed text driving instructions. The skilled artisan will appreciate that the aforementioned map 310 is suitably displayed on any one of the user devices 110-118 via any suitable connection to the Internet 102. It is to be further appreciated that the information thus made available is suitably used in conjunction with a navigation system that allows updated travel, direction and routing information as a user approaches a selected service center. The subject system also allows a user to continue to monitor available service centers during transit to allow for modification to a substitute service center should situations such as business level or routing concerns, such as traffic, detours or hazards, alter a previously establishment.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for directing customers to a business establishment comprising:
   a processor user device including a service locator configured to receive a query from an associated user, which query is representative of a desired purveyor of at least one of selected goods and services in a selected geographic area;
   the service locator configured to secure, into a memory, data representative of a set of purveyors of the at least one of selected goods and services in the selected geographic area from an associated database;
   the service locator configured to retrieve, via a computer network, near real time business activity data from each purveyor of goods or services in the set thereof, the business activity data including at least one of the group consisting of a number of customers in line, an average wait time for access, an amount of traffic to, and operating hours associated with each purveyor in the set thereof;
   the service locator configured to generate a business activity level signal representative of a level of the near real time business activity for each purveyor in the set thereof;
   the service locator configured to generate relative ranking information corresponding to the business activity level for each purveyor in the set thereof; and
   a display associated with the user device for displaying, in accordance with the data representative of the set of purveyors, a map on the user device showing a location and the near real time business activity data with the relative ranking information for the set of purveyors.

2. The system for directing customers to a business establishment of claim 1, wherein the service locator is further configured to generate a color signal representative of the business activity level signal.

3. The system for directing customers to a business establishment of claim 2, wherein the service locator is configured to generate map data, which map data includes data evidencing a location of each purveyor in the set thereof.

4. The system for directing customers to a business establishment of claim 3, wherein the business activity level signal is associated with the map data such that the business activity level of each purveyor is associated with the location of each purveyor.

5. A method for directing customers to a business establishment comprising the steps of:
   receiving at a service locator operable on a processor user device, a query from an associated user, which query is representative of a desired purveyor of at least one of selected goods and services in a selected geographic area;
   securing via the service locator data representative of a set of purveyors of the at least one of selected goods and services in the selected geographic area from an associated database;
   retrieving via the service locator near real time business activity data from each purveyor of goods or services in the set thereof into a memory, the business activity data including at least one of the group consisting of a number of customers in line, an average wait time for access, an amount of traffic to, and operating hours associated with each purveyor in the set thereof;
   generating via the service locator a business activity level signal representative of a level of business activity for each purveyor in the set thereof;
   generating, via the service locator, relative ranking information corresponding to the business activity for each purveyor in the set thereof;
   and,
   displaying via the user device a map in accordance with the data representative of the set of purveyors, the map showing a location and the near real time business activity data with the relative ranking information for the set of purveyors.

6. The method for directing customers to a business establishment of claim 5, wherein the step of generating a business activity signal includes generating a color signal representative of the business activity level signal.

7. The method for directing customers to a business establishment of claim 6, wherein the step of generating a business activity level signal includes generating ranking information corresponding to the business activity level for each purveyor.

8. The method for directing customers to a business establishment of claim 6, wherein the step of receiving a query includes receiving the query via at least one of a wireless network data connection and a wired network data connection.

9. The method for directing customers to a business establishment of claim 6, further comprises the step of generating map data, which map data includes data evidencing a location of each purveyor in the set thereof.

10. The method for directing customers to a business establishment of claim 9, wherein the business activity level signal is associated with the map data such that the business activity level of each purveyor is associated with the location of each purveyor.

11. The method for directing customers to a business establishment of claim 6, wherein the step of communicating the data representative of the set of purveyors and each corresponding business activity signal to the associated user includes communicating the data via at least one of a wireless network data connection and a wired network data connection.

12. A computer-implemented method for directing customers to a business establishment comprising the steps of:
receiving, at a service locator operable on a processor user device, a query from an associated user, which query is representative of a desired purveyor of at least one of selected goods and services in a selected geographic area;
securing, via the service locator, data representative of a set of purveyors of the at least one of selected goods and services in the selected geographic area from an associated database;
retrieving, via the service locator, near real time business activity data for each purveyor of goods or services in the set thereof into a memory, the business activity data including at least one of the group consisting of a number of customers in line, an average wait time for access, an amount of traffic to, and operating hours associated with each purveyor in the set thereof;
generating, via the service locator, a business activity level signal representative of a level of business activity for each purveyor in the set thereof;
generating, via the service locator, relative ranking information corresponding to the business activity level for each purveyor in the set thereof;
and,
displaying via the user device a map in accordance with the data representative of the set of purveyors, the map showing a location and the near real time business activity data with the relative ranking information for the set of purveyors.

13. The computer-implemented method for directing customers to a business establishment of claim 12, wherein the step of generating a business activity signal includes generating a color signal represent the business activity level signal.

14. The computer-implemented method for directing customers to a business establishment of claim 13, wherein the step of generating a business activity level signal includes generating ranking information corresponding to the business activity level for each purveyor.

15. The computer-implemented method for directing customers to a business establishment of claim 13, wherein the step of receiving a query includes receiving the query via at least one of a wireless network data connection and a wired network data connection.

16. The computer-implemented method for directing customers to a business establishment of claim 13, further comprises the step of generating map data, which map data includes data evidencing a location of each purveyor in the set thereof.

17. The computer-implemented method for directing customers to a business establishment of claim 16, wherein the business activity level signal is associated with the map data such that the business activity level of each purveyor is associated with the location of each purveyor.

18. The computer-implemented method for directing customers to a business establishment of claim 13, wherein the step of communicating the data representative of the set of purveyors and each corresponding business activity signal to the associated user includes communicating the data via at least one of a wireless network data connection and a wired network data connection.

19. A system for directing customers to a business establishment comprising:
an input operable for receiving, at a service locator operable on a processor user device, a query from an associated user, which query is representative of a desired purveyor of at least one of selected goods and services in a selected geographic area;
a processor operable for securing, via the service locator, data representative of a set of purveyors of the at least one of selected goods and services in the selected geographic area from an associated database;
the processor further operable for retrieving, via the service locator, near real time business activity data for each purveyor of goods or services in the set thereof into a memory, the business activity data including at least one of the group consisting of a number of customers in line, an average wait time for access, an amount of traffic to, and operating hours associated with each purveyor in the set thereof;
the processor further operable for generating, via the service locator, a business activity level signal representative of a level of business activity for each purveyor in the set thereof;
the processor further operable for generating, via the service locator, relative ranking information corresponding to the business activity level for each purveyor in the set thereof; and,
a display operable for displaying via the user device a map in accordance with the data representative of the set of purveyors, the map showing a location and the near real time business activity data with the relative ranking information for the set of purveyors.

20. The system for directing customers to a business establishment of claim 19, wherein the processor is further operable for generating a color signal represent the business activity level signal.

21. The system for directing customers to a business establishment of claim 20, wherein the processor is further operable for generating ranking information corresponding to the business activity level for each purveyor.

22. The system for directing customers to a business establishment of claim 20, wherein the query is received via at least one of a wireless network data connection and a wired network data connection.

23. The system for directing customers to a business establishment of claim 20, wherein the processor is further operable for generating map data, which map data includes data evidencing a location of each purveyor in the set thereof.

24. The system for directing customers to a business establishment of claim 23, wherein the business activity level signal is associated with the map data such that the business activity level of each purveyor is associated with the location of each purveyor.

25. The system for directing customers to a business establishment of claim 20, wherein the data representative of the set of purveyors and each corresponding business activity signal is communicated to the associated user via at least one of a wireless network data connection and a wired network data connection.

* * * * *